(12) United States Patent
Yoshimura et al.

(10) Patent No.: US 10,455,617 B2
(45) Date of Patent: Oct. 22, 2019

(54) TERMINAL APPARATUS AND BASE STATION APPARATUS

(71) Applicant: Sharp Kabushiki Kaisha, Sakai, Osaka (JP)

(72) Inventors: Tomoki Yoshimura, Sakai (JP); Hiromichi Tomeba, Sakai (JP); Takashi Onodera, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/541,843

(22) PCT Filed: Jan. 4, 2016

(86) PCT No.: PCT/JP2016/050040
§ 371 (c)(1),
(2) Date: Jul. 6, 2017

(87) PCT Pub. No.: WO2016/111264
PCT Pub. Date: Jul. 14, 2016

(65) Prior Publication Data
US 2018/0007714 A1 Jan. 4, 2018

(30) Foreign Application Priority Data
Jan. 6, 2015 (JP) ................................ 2015-001187

(51) Int. Cl.
*H04W 74/08* (2009.01)
*H04W 84/12* (2009.01)
*H04W 92/18* (2009.01)

(52) U.S. Cl.
CPC ... *H04W 74/0816* (2013.01); *H04W 74/0808* (2013.01); *H04W 84/12* (2013.01); *H04W 92/18* (2013.01)

(58) Field of Classification Search
CPC . H04W 74/08; H04W 74/0816; H04W 84/12; H04W 92/18
See application file for complete search history.

(56) References Cited

U.S. PATENT DOCUMENTS 9,854,607 B1 * 12/2017 Chu ..................... H04W 52/241
2016/0081010 A1 * 3/2016 Seok ................. H04W 74/0816
370/329
2017/0181039 A1 * 6/2017 Adachi ................. H04W 48/10

OTHER PUBLICATIONS

Graham Smith; Dynamic Sensitivity Control Practical Usage; IEEE 802.11-14/0779r2; Jun. 2014.
(Continued)

*Primary Examiner* — Kyaw Z Soe
(74) *Attorney, Agent, or Firm* — ScienBiziP, P.C.

(57) ABSTRACT

A CCA level is made to be variable efficiently while maintaining the fairness relating to acquisition of a transmission opportunity by wireless terminal apparatuses, and thus efficiency of a radio resource is improved. Provided is a terminal apparatus that performs wireless communication with a base station apparatus, and includes; a MAC frame categorization unit categorizing MAC frames, in each of which media access control header is attached to transmission data, based on a type of MAC frame; and a QoS control unit performing a carrier sense using a first CCA level, in a case where the MAC frame is included in a first category that results from the categorization by the MAC frame categorization unit, and performing the carrier sense using a second CCA level different from the first CCA level, in a case where the MAC frame is included in a second category different from the first category.

5 Claims, 12 Drawing Sheets

(56) References Cited

OTHER PUBLICATIONS

Sean Coffey, DZ Liu, Brian Hart and Guido Hiertz; A Protocol Framework for Dynamic CCA; IEEE 802.11-14/0872r0; Jul. 14, 2014.

* cited by examiner

FIG. 3

| Priority | UP | AC | Designation |
|---|---|---|---|
| Lowest → Highest | 1 | AC_BK | Background |
| | 2 | AC_BK | Background |
| | 0 | AC_BE | Best effort |
| | 3 | AC_BE | Best effort |
| | 4 | AC_VI | Video |
| | 5 | AC_VI | Video |
| | 6 | AC_VO | Voice |
| | 7 | AC_VO | Voice |

FIG. 8

| AC | CWmin | CWmax | AIFSN | CCA Offset(dB) |
|---|---|---|---|---|
| AC_BK | aCWmin | aCWmax | 7 | −3 |
| AC_BE | aCWmin | aCWmax | 3 | 0 |
| AC_VI | (aCWmin+1)/2−1 | aCWmin | 2 | +10 |
| AC_VO | (aCWmin+1)/4−1 | (aCWmin+1)/2−1 | 2 | +20 |

TERMINAL APPARATUS AND BASE STATION APPARATUS

TECHNICAL FIELD

The present invention relates to a technology of a terminal apparatus and a base station apparatus that control a transmission opportunity using a carrier sense.

BACKGROUND ART

In recent years, wireless local area network (LAN) has found wide practical application. Building on IEEE 802.11n, which are wireless LAN standards, IEEE 802.11ac standards have been established by the Institute of Electrical and Electronics Engineers, Inc. (IEEE). At present, standardization activities for IEEE 802.11ax have been started as a successor to IEEE 802.11n/ac. In 802.11ax Task Group (TG), unlike conventional wireless LAN standards, an improvement in user throughput per wireless terminal apparatus, as well as an improvement in peak throughput, is given as a fundamental requirement, in consideration of a scenario that Access Points (AP) or stations (STA) are densely arranged. For the improvement in user throughput, the introduction of a high-efficiency simultaneous multiplex transmission scheme (access scheme) is indispensable.

In standards up to and including IEEE 802.11ac, an access scheme is employed that is an autonomous distribution control scheme, which is referred to as Carrier Sense Multiple Access with Collision Avoidance (CSMA/CA) as an access scheme. In the CSMA/CA, the opportunity of the wireless terminal apparatus (the AP, the STA, or the like) to perform transmission is temporally divided using a carrier detection process referred to as a Carrier Sense (CS). For example, the wireless terminal apparatus can determine, using a threshold referred to as the Carrier Sense Level, that, in a case where a power higher than a Carrier Sense Level is detected, the radio resource is busy, and that, in a case where only a power lower than the Carrier Sense Level is detected, the radio resource is idle. The Carrier Sense Level is also referred to as a Clear Channel Assessment Level (CCA level), a CCA Threshold, or the like.

For the efficient use of the radio resource, in IEEE 802.11ax TG, a system has been under study in which every wireless terminal apparatus makes the CCA level variable based on information (a reception level (Received Signal Strength Indication (RSSI) of a signal received from the AP that is connected), the number of times that a transmission error occurs, or the like) relating to the reliability of data communication (NPL 1 and NPL 2). If the CCA level is raised, because the opportunity of the wireless terminal apparatus to determine that the radio resource is busy occurs less frequently, it is considered that the transmission opportunity (TXOP) can be efficiently ensured even under the environment where the APs or the STAs are densely arranged. Because the raising of the CCA level increases the number of wireless terminal apparatuses that obtains the TXOP in the same radio resource, there is a problem that the number of interference signals increases, but it is expected that communication quality is maintained with adaptive modulation transmission or the like.

CITATION LIST

Non Patent Literature

NPL 1: IEEE 802.11-14/0779r2
NPL 2: IEEE 802.11-14/0872r0

SUMMARY OF INVENTION

Technical Problem

However, in a case where a system in which every wireless terminal apparatus changes the CCA level is used, the wireless terminal apparatus that has high reliability of the data transmission can acquire the transmission opportunity more frequently because the CCA level can be raised. On the other hand, the wireless terminal apparatus that has low reliability of the data transmission takes the transmission opportunity less frequently because the CCA level is difficult to raise. As a result, there is a likelihood that the number of wireless terminal apparatuses that have low user throughput will increase.

An object of the present invention, which is made in view of the situation described above, is to provide a terminal apparatus and a base station apparatus that are capable of improving efficiency of a radio resource by efficiently making a CCA level variable while maintaining the fairness relating to acquisition of opportunities of wireless terminal apparatuses to perform transmission.

Solution to Problem

To accomplish the object described above, the present invention is contrived to provide the following means. That is, according to the present invention, there is provided a terminal apparatus that finds application in a communication system which controls a transmission opportunity using a carrier sense, and that performs wireless communication with a base station apparatus. The terminal apparatus includes; a MAC frame categorization unit that categorizes MAC frames using a MAC frame categorization information for categorizing the MAC frames, and a QoS control unit that performs a carrier sense, for every category, on the MAC frame that results from the categorization. The QoS control unit changes a CCA level of the carrier sense performed for every category, based on first clear channel assessment (CCA) indication information obtained from the base station apparatus.

In this manner, the MAC frames are categorized using the MAC frame categorization information for categorizing the MAC frames, and the CCA level of the carrier sense performed for every category is changed based on first CCA indication information acquired from the base station apparatus, when the carrier sense is performed, for every category, on the MAC frame that results from the categorization. Because of this, it is possible that the CCA level is made to be variable efficiently while maintaining the fairness relating to acquisition of opportunities of terminal apparatuses to perform transmission.
As a result, it is possible that efficiency of a radio resource is improved.

Advantageous Effects of Invention

According to the present invention, it is possible that a CCA level is made to be variable efficiently while maintaining the fairness relating to acquisition of opportunities of wireless terminal apparatuses to perform transmission. As a result, the efficiency of the radio resource is improved, and it is possible that user throughput is greatly improved.

BRIEF DESCRIPTION OF DRAWINGS

FIG. 3 is a table illustrating an example of a correspondence between each AC and a parameter.

FIG. 8 is a diagram illustrating an example of an EDCA parameter notified by the AP 1 according to the present embodiment.

DESCRIPTION OF EMBODIMENTS

First Embodiment

A communication according to the present embodiment includes an Access Point (AP) that performs wireless transmission and wireless reception, or a station (STA) that performs the wireless transmission and the wireless reception, or the AP and the STA. Furthermore, a network that has the AP, the STA, or the AP and the STP is referred to as a basic service set (BSS).

Figure 1:
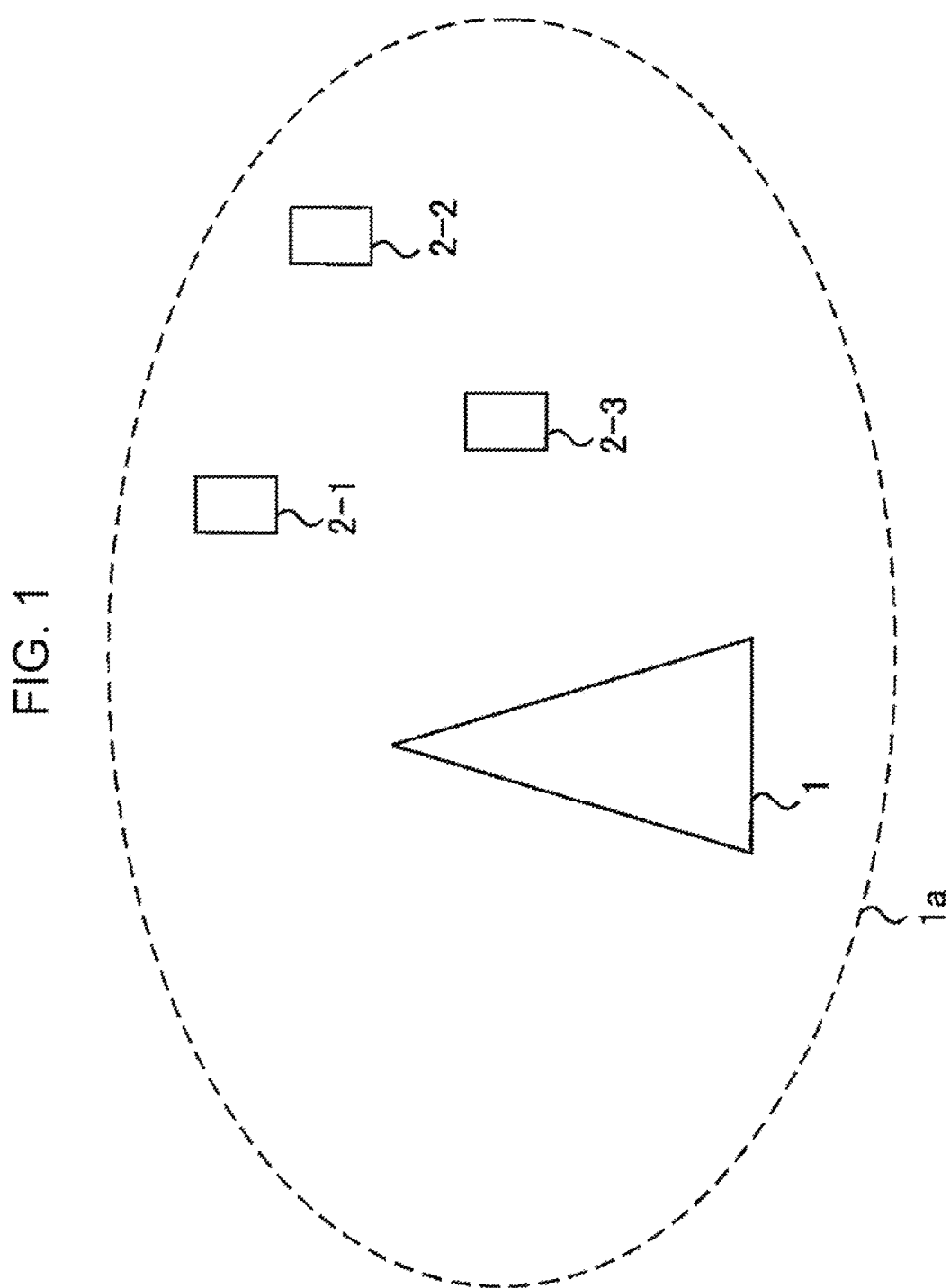
FIG. 1 is a schematic diagram illustrating an example of a communication system according to a first embodiment.

FIG. 1 is a schematic diagram illustrating an example of a communication system according to a first embodiment of the present invention. The communication system in FIG. 1 includes an AP 1, STAs 2-1 to 2-3, and a BSS 1a. The BSS 1a has the AP 1 and the STAs 2-1 to 2-3. The STAs 2-1 to 2-3 is hereinafter simply referred to as a STA 2.

The AP 1 and the STA 2 each are assumed to perform communication based on carrier sense multiple access with collision avoidance (CSMA/CA). In the present embodiment, an infrastructure mode in which the STA 2 and the AP 1 perform communication is intended, but a method according to the present embodiment is capable of being implemented also in an ad hoc mode in which the STAs 2 directly perform communication.

Figure 2:
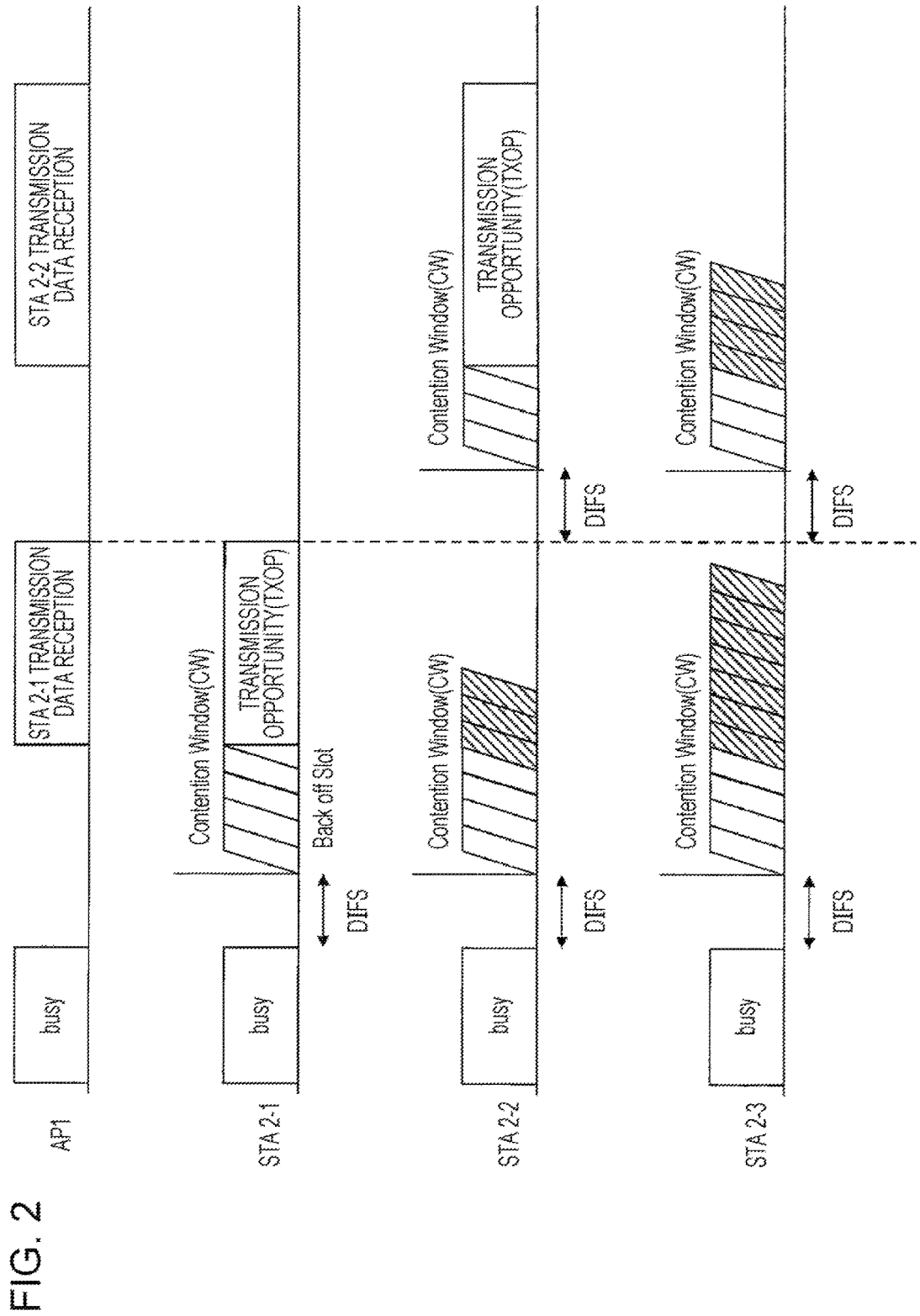
FIG. 2 is a schematic diagram illustrating an example of an aspect of communication in a system in compliance with IEEE 802.11, which performs the communication based on CSMA/CA.

FIG. 2 is a diagram illustrating an example of an aspect of communication in a system in compliance with IEEE 802.11, which performs the communication based on the CSMA/CA. In FIG. 2, as an example, uplink (UL) communication is assumed to be performed, but in the method according to the present embodiment, downlink (DL) communication may be possible. The STA 2 performs a Carrier Sense (CS) based on the CSMA/CA, and thus determines a state of a radio resource.

Specifically, in a case where a power higher than a Carrier Sense Level is detected using a threshold referred to as the Carrier Sense Level, the radio resource can be determined as being busy, and in a case where only a power lower than the Carrier Sense Level is detected, the radio resource can be determined as being idle. The Carrier Sense Level is also referred to as a Clear Channel Assessment Level (CCA level) or a CCA Threshold. In an example in FIG. 2, the STA 2 is changed from busy to idle, and transmission preparation is started. First, as a first stage of the transmission preparation, the STA 2 performs the Carrier Sense only for a waiting time (Interframe Space (IFS)) that is configured in advance and determines the state of the radio resource.

In FIG. 2, as the waiting time, a Distributed IFS (DIFS) is configured. As the IFS, in addition, there are a Short IFS used for transmission of a transmission frame that has a high priority level, such as an acknowledgment (Ack), an Extended IFS (EIFS) that is used such as when the radio resource is determined as being busy, but the frame is difficult to receive correctly, and the like. Furthermore, in IEEE 802.11e, there is an Attribution IFS (AIFS) that varies in a manner that corresponds to a priority level which is based on a category (Access Category (AC)) of the transmission frame introduced for improvement in Quality of Service (QoS). The QoS and the AIFS will be described below.

The STA 2 waits only the IFS configured in advance, and then proceeds to a backoff. In the backoff, each STA 2 causes a random value to occur, and waits only as much waiting time (Slot Time) as random value×1 slot for transmission. The waiting time that occurs randomly is also referred to as a Contention Window (CW). The AP 1 instructs each STA 2 that makes a connection, on an upper limit value (CW max) and a lower limit value (CW min) of the random value that each STA 2 causes to occur. In a case where there is no instruction from the AP 1, the STA 2 depends on information retained within the STA 2 itself, or configures an initial value. Furthermore, a specific value (User Priority (UP)) configured for every transmission frame for the purpose of QoS control can be configured for a CW max and a CW min. The STAs 2 have different CW's, and thus collisions among data frames can be efficiency avoided.

In the example in FIG. 2, because the STA 2-1 has the shortest CW, the STA 2-1 is the first to acquire a transmission opportunity, and can transmit data to the AP 1 that is connected. Furthermore, when the STA 2-1 completed data transmission, the remaining STAs 2-2 and 2-3 each wait the DIFS and only the rest of the CW, and the STA 2-2 that waits the rest of the CW which is shorter acquires a transmission opportunity. It is noted that, also while the CW counts down, the STA 2 performs the Carrier Sense, and when the radio resource is determined as being busy, the CW stops counting down.

In IEEE 802.11e, priority level control that is based on the AC is stipulated for the purpose of an improvement in QoS. FIG. 3 is a table illustrating an example of a correspondence between each AC and a parameter. The AC and a name (Designation) thereof are configured for each UP, and an Enhanced Distributed Channel Access parameter (EDCA parameter) is configured in order of increasing the priority level, that is, in this order: AC_VO, AC_VI, AC_BE, AC_BK. The EDCA parameters include parameters that are used when accessing the radio resource, such as a length of the AIFS, a CW min, and a CW max. The EDCA parameter is configured for every AC, and thus it is possible that the QoS is improved.

The EDCA parameter used for the QoS can be notified by the AP 1 to the STA 2, using a broadcast signal (beacon). Furthermore, in a case where the EDCA parameter is notified by the AP 1, an EDCA parameter (default EDCA parameter set) that is configured in advance for the STA 2 can be used.

Figure 4:
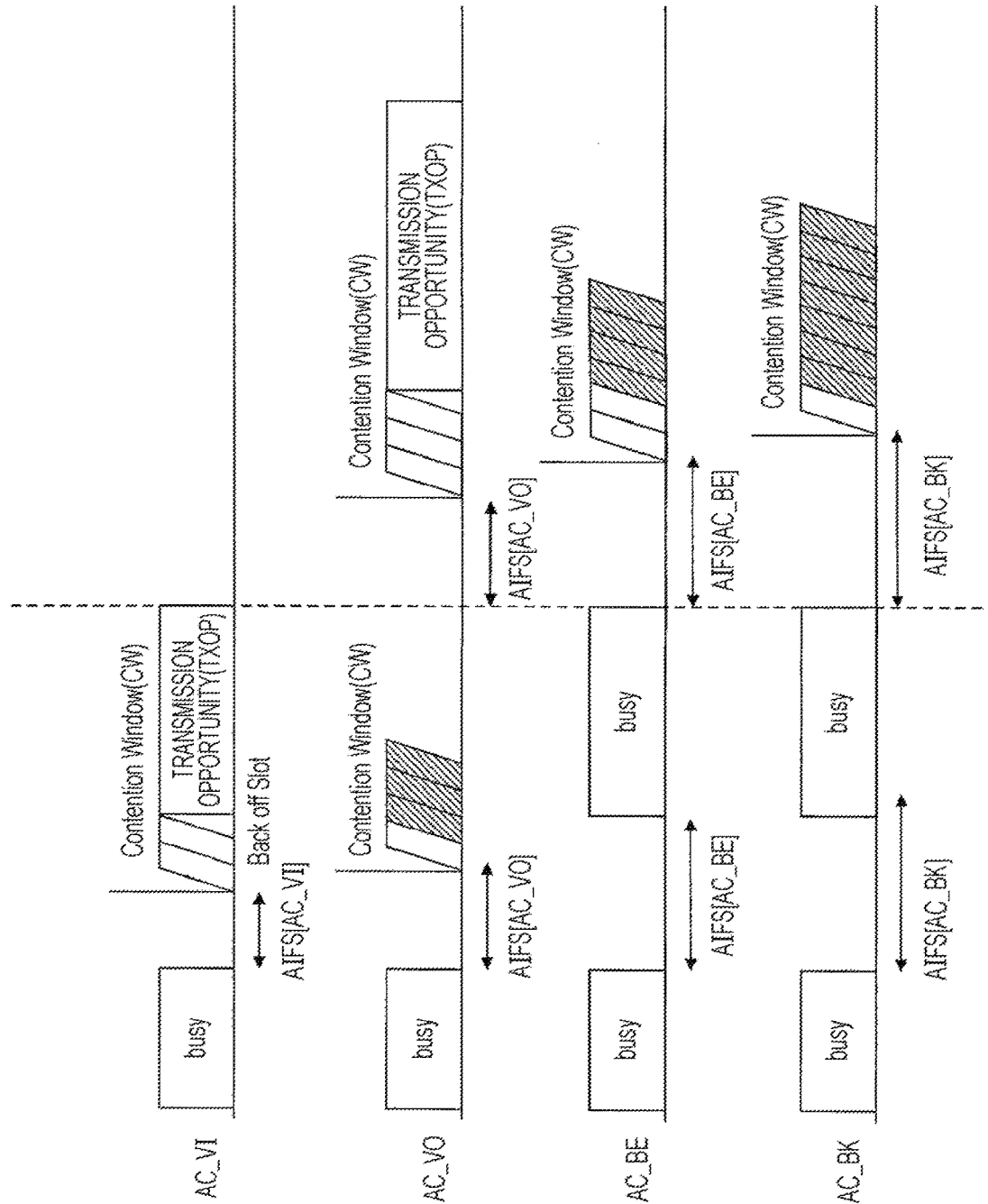
FIG. 4 is a schematic diagram illustrating an example of operation relating to QoS of a STA 2 according to the present embodiment.

FIG. 4 is a schematic diagram illustrating an example of operation relating to QoS of the STA 2 according to the present embodiment. The STA 2 categories a group of pieces of transmission data on which prioritization is performed, for every AC. The STA 2 waits only the AIFS that corresponds to the AC, configures each backoff, and operates as if contention occurs within the terminal. At this point, AIFS[ACx] indicates a value of the AIFS when the AC is ACx. With the use of AC_VI in which the AC has the highest priority level, AIFS[AC_VI] is used, and proceeding to the backoff takes place most quickly.

Next, the random value is caused to occur based on values of CW min and CW max, and the CW is configured. At this time, it is considered that, with the use of AC_VI that has the highest priority level, the smallest CW min and CW max are configured, but because the random value is used, there is also a case where a size of the CW is no smaller than that of the CW configured with the use of another AC.

In an example in FIG. 4, AC_VI acquires a transmission opportunity, and subsequently, AC_VO acquires a transmission opportunity. AC_VO or AC_VI in which the AIFS is configured to be short acquires a transmission opportunity with ease, and AC_BE or AC_BK in which the AIFS is configured to be long acquires a transmission opportunity with difficulty.

Figure 5:
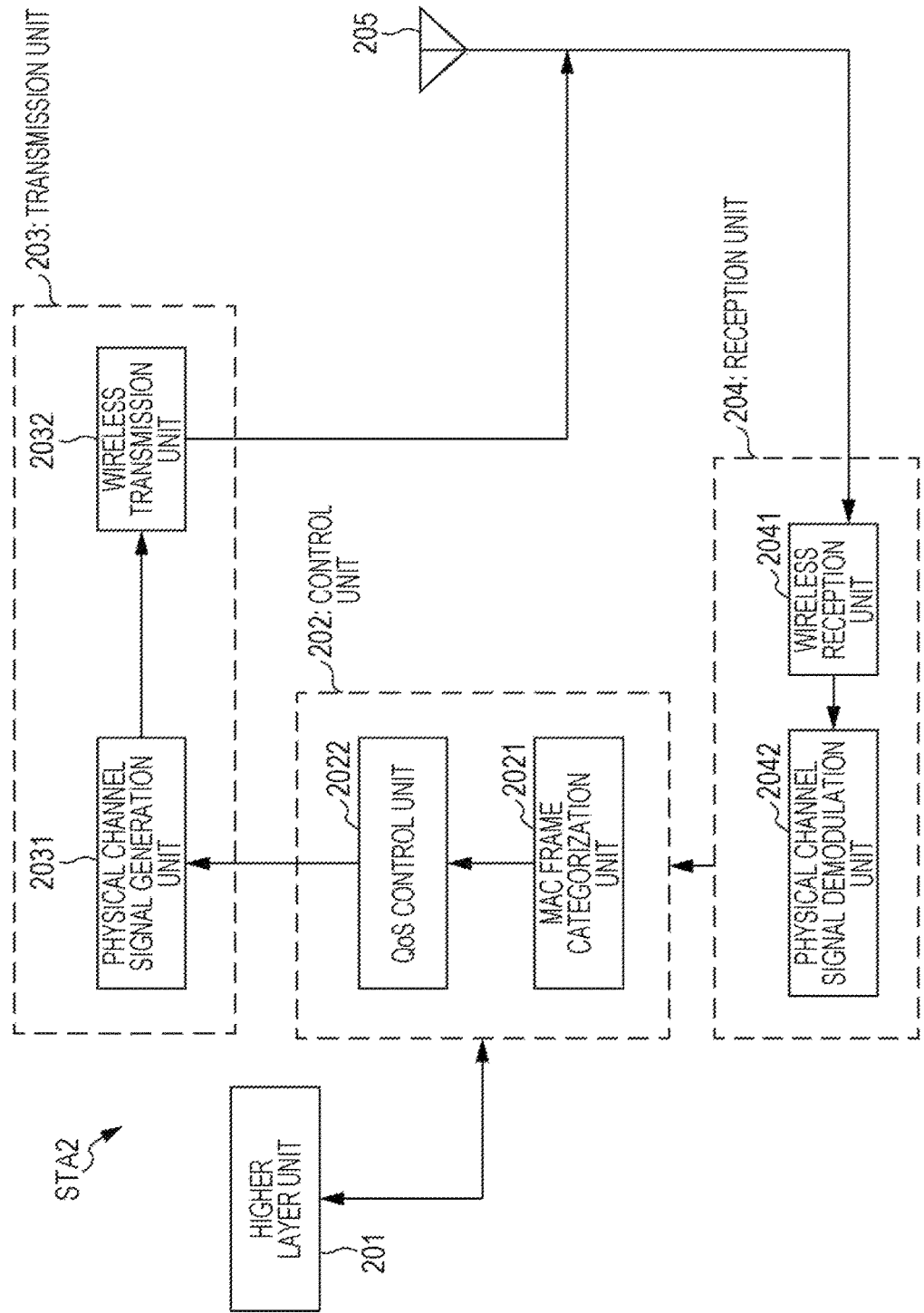
FIG. 5 is a block diagram illustrating an example of a constitution of the STA 2 according to the present embodiment.

FIG. 5 is a block diagram illustrating an example of a constitution of the STA 2 according to the present embodiment. As illustrated in FIG. 5, the STA 2 has a higher layer unit 201, a control unit 202, a transmission unit 203, a reception unit 204, and an antenna unit 205.

The higher layer unit 201 sends a MAC frame in which a Media Access Control (MAC) header is attached to transmission data, and a value of the AC, which is associated with the MAC frame, to the control unit 202. Furthermore, demodulation data obtained by the control unit 202 from the reception unit 204 is sent to the higher layer unit 201, and retransmission and the like are performed by a media access control layer and Logical Link Control (LLC) that are included in the higher layer unit 201.

Figure 6:
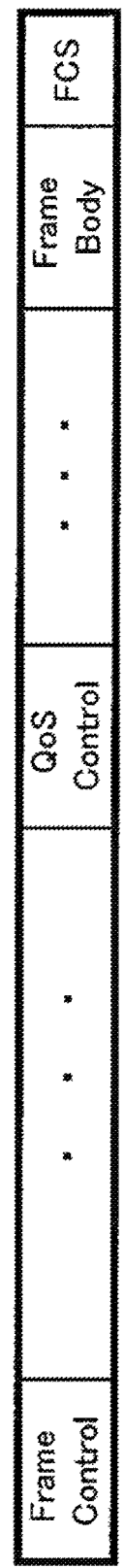
FIG. 6 is a diagram illustrating an example of a MAC frame generated by a higher layer unit 201.

FIG. 6 is a diagram illustrating an example of the MAC frame generated by the higher layer unit 201. A frame control subfield is used for determination of a transmission type or for fragment control. A QoS control subfield is used for notifying information (a Traffic Identifier (TID)) relating to the QoS.

The STA 2 according to the present embodiment, for example, may notify information relating to the QoS or information a CCA level, for example, with the QoS control subfield. Furthermore, notification means is not limited to this. As the notification means, other subfields or a field within a header (a Physical Layer Convergence Protocol header (PLCP header), a PHY header, or the like) relating to a physical layer (PHY layer) attached to the MAC frame with the use of the physical layer may be used, and a portion of the transmission data may be used. A frame body is sent from the higher layer unit 201 and expresses the transmission data. A Frame Check Sequence (FCS) field is used for detection of an error in the MAC frame.

In FIG. 5, the control unit 202 has a MAC frame categorization unit 2021 and a QoS control unit 2022. The MAC frame categorization unit 2021, for example, categorizes the MAC frames that are sent from the higher layer unit 201, for every AC, using a value of the AC associated with the MAC frame. The post-categorization MAC frame is sent to the QoS control unit 2022.

It is noted that operation of the MAC frame categorization unit 2021 is not limited to what is described above. For example, the MAC frame categorization unit 2021 can perform categorization according to a reference that is based on the number of times that the MAC frame is retransmitted. Specifically, the MAC frame categorization unit 2021 can categorize the MAC frame according to a size of value of a retry count, with reference to information (a Short Retry Count (SRC) or a Long Retry Count (LRC) (the SRC and the LRC are hereinafter collectively referred to as the retry count) relating to the number of times associated with the MAC frame.

Furthermore, the MAC frame categorization unit 2021 can categorize the MAC frames according to a size of information (a data size, an amount of information, a payload size, a frame length, a data length, or the like) relating to a size of the MAC frame. Furthermore, in addition, the MAC frame categorization unit 2021 may categorize radio resources and may categorize MAC frames according to the number of multiplex frames.

An example of a case where the MAC frame categorization unit 2021 performs the categorization according to the AC of the MAC frame will be described below, but the present embodiment is not limited to this. Information used by the MAC frame categorization unit 2021 for categorizing the MAC frame is referred to as MAC frame separation information.

The QoS control unit 2022 retains the post-categorization MAC frame, which is sent from the MAC frame categorization unit 2021, performs autonomous distribution control that is based on the CSMA/CA, for every AC or for every category that results from performance by the MAC frame categorization unit 2021, and sends the MAC frame that gains a transmission opportunity, to a physical channel signal generation unit 2031. Operation of the QoS control unit 2022 will be in detail below.

The transmission unit 203 has the physical channel signal generation unit 2031 and a wireless transmission unit 2032.

The physical channel signal generation unit 2031 converts the transmission data sent from the QoS control unit 2022, into a physical channel signal (baseband signal). Furthermore, the physical channel signal generation unit 2031 converts a Training Field (TF) used for channel estimation, into the physical channel signal. The physical channel signal generation unit 2031 multiplexes the physical channel signal generated from the MAC frame, and the TF, and generates the transmission frame. Physical channel signal conversion processing performed by the physical channel signal generation unit 2031 includes error correction coding, mapping, and the like.

The wireless transmission unit 2032 performs processing that converts the transmission frame generated by the physical channel signal generation unit 2031 into a signal in a Radio Frequency (RF) band. Processing performed by the wireless transmission unit 2032 includes digital-to-analog conversion, filtering, frequency conversion from a baseband to a RF band, and the like.

The reception unit 204 demodulates a signal in the RF band, which is received by the antenna unit 205. The reception unit 204 has a wireless reception unit 2041 and a physical channel signal demodulation unit 2042.

The wireless reception unit 2041 converts the signal in the RF band received by the antenna unit 205, into the physical channel signal. Processing performed by the wireless reception unit 2041 includes processing for conversion from the RF band to the baseband, filtering, and analog-to-digital conversion. Furthermore, the wireless reception unit 2041 obtains information associated with a received power of the signal in the RF band, which is received by the antenna unit 205. Information associated with the received power is sent to the control unit 202, a comparison with the CCA level is made in the QoS control unit 2022, and a determination of whether the radio resource is busy or idle is made.

The physical channel signal demodulation unit 2042 performs channel equalization, demapping, error correction decoding processing, and the like on the physical channel signal generated by the wireless reception unit 2041, and generates the demodulation data. The demodulation data is sent to the control unit 202, and then is sent to the higher layer unit 201.

The antenna unit 205 transmits the signal in the RF band, which is sent from the wireless transmission unit 2032, to a wireless space, in state of being destined for the STA 2. Furthermore, the signal in the RF band, which is transmitted from the STA 2, is received by the wireless space.

Figure 7:
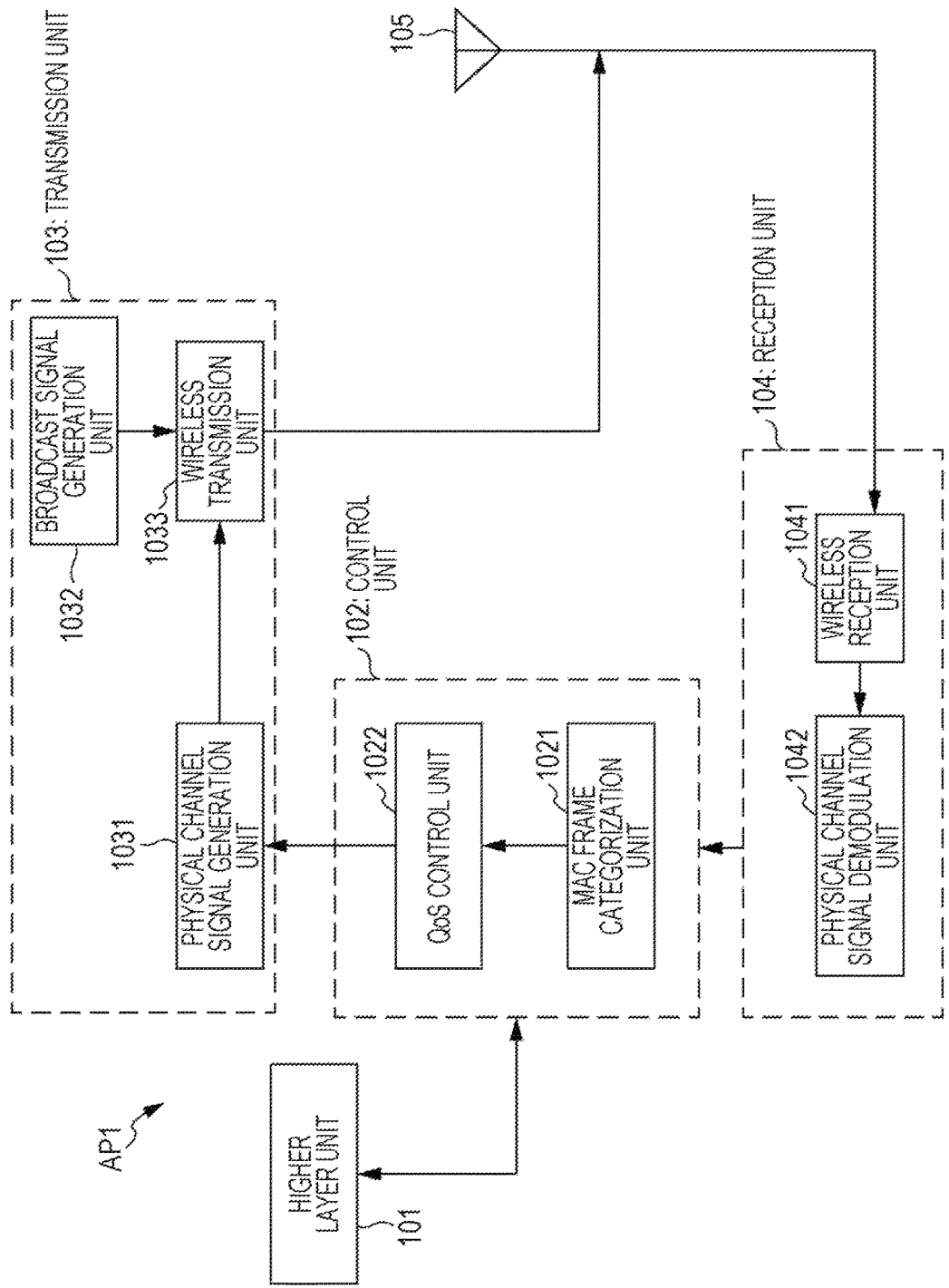
FIG. 7 is a block diagram illustrating an example of a constitution of an AP 1 according to the present embodiment.

FIG. 7 is a block diagram illustrating an example of a constitution of the AP 1 according to the present embodiment. The AP 1 has a higher layer unit 101, a control unit 102, a transmission unit 103, a reception unit 104, and an antenna unit 105.

The higher layer unit 101 attaches a MAC header to the transmission data from a higher layer, and thus generates the MAC frame. Furthermore, the control unit 102 processes the MAC frame sent from the control unit 102.

The control unit 102 has a MAC frame categorization unit 1021 and a QoS control unit 1022. The MAC frame categorization unit categorizes the MAC frames based on the MAC frame separation information. For example, the MAC frames are categorized based on the MAC frame sent from the higher layer unit 101, and the value of the AC associated with the MAC frame.

The QoS control unit 1022 retains the post-categorization MAC frame, which is sent from the MAC frame categorization unit 1021, performs the autonomous distribution control that is based on the CSMA/CA, for every AC or for every category that results from performance by the MAC frame categorization unit 1021, and sends the MAC frame that gains a transmission opportunity, to a physical channel signal generation unit 1031. Operation of the QoS control unit 1022 will be in detail below.

The transmission unit 103 has the physical channel signal generation unit 1031, a broadcast signal generation unit 1032, and a wireless transmission unit 1033. The physical channel signal generation unit 1031 converts the transmission data sent from the QoS control unit 1022, into the physical channel signal (baseband signal). Furthermore, the physical channel signal generation unit 1031 also converts the TF used for the channel estimation, into the physical channel signal. The physical channel signal generation unit 1031 multiplexes the physical channel signal generated from the MAC frame, and the TF, and generates the transmission frame. The physical channel signal conversion processing performed by the physical channel signal generation unit 1031 includes the error correction coding, the mapping, and the like.

The broadcast signal generation unit 1032 generates the broadcast signal. The generated broadcast signal is converted into the physical channel signal, and is sent to the wireless transmission unit 1033. The broadcast signal can include information elements, such as a Beacon Interval (broadcast signal interval), Supported Rates, a Power Constraint, a Transmit Power Control Report (TPC report), an EDCA parameter, and a QoS Capability information element. The Beacon Interval is an information element used to notify the STA 2, which connects to the AP 1, of an interval at which the broadcast signal is notified. The Supported Rates are information elements that are used to notify the STA 2 of a data rate (a coding rate or a transmission rate given by a modulation scheme) which is supported by the AP 1 (or a BSS 1a).

The Power Constraint is an information element used for the AP 1 to notify the STA 2 of information relating to a transmit power. The TPC Report is an information element used for the AP 1 to notify the STA 2 of information relating to TPC. The EDCA parameter is an information element used for the AP 1 to notify the STA 2 of information relating to the EDCA parameter.

FIG. 8 is a diagram illustrating an example of the EDCA parameter notified by the AP 1 according to the present embodiment. The AP 1 can notify the STA 2 of first CCA indication information indicating a change of a CCA level of the STA 2, in a state of being added to the information relating to the EDCA parameter. The AP 1 may use a CCA Offset, as the first CCA indication information, which explicitly indicates a change value of the CCA level of the STA 2. Operation of the STA 2 that is performed when the first CCA indication information is notified will be described in detail below. It is noted that a method in which the AP 1 notifies the first CCA indication information is not limited to this, and that the first CCA indication information may be added to a PHY header (a physical header or a PLCP header) and be inserted into the transmission data.

A CWmin and a CWmax are values that are decided in advance within the terminal or the BSS, in compliance with IEEE 802.11 standards. The STA 2 generates a CW of each AC, using a CWmin, a CWmax, or both that are included in the EDCA parameter that is broadcast from the AP 1. An AIFSN is a parameter used for the STA 2 to calculate the AIFS. AIFS[ACx] relating to a value ACx of the AC, for example, is calculated by Equation (1).

$$AIFS[ACx]=AIFSN[ACx]*aSlotTime+aSIFSTime \tag{1}$$

In Equation (1), aSlotTime is a value of Slot Time configured in advance within the STA 2 or the BSS 1a, or in compliance with IEEE 802.11 standards. Furthermore, aSIF-STime is a value of the SIFS configured in advance within the STA 2 or the BSS 1a, or in compliance with IEEE 802.11 standards. The QoS control unit 2022 of the STA 2 performs the autonomous distribution control that is based on the CSMA/CA, for every AC, using the value of the AIFS demanded by Equation (1).

The AP 1 according to the present embodiment, for example, can add the first CCA indication information to a portion of the broadcast signal generated by the broadcast signal generation unit 1032, a portion of the EDCA parameter that is an information element, or portions of other information elements. The AP 1 converts the broadcast signal generated by the broadcast signal generation unit 1032, into an RF signal, and transmits the resulting RF signal in a state of being destined for the STA 2, using the antenna unit 105. The STA 2 receives the broadcast signal transmitted by the antenna unit 105, and performs reception processing, using the reception unit 204. The MAC frame that goes through the reception processing is sent to the higher layer unit 201, and the first CCA indication information that is present within the broadcast signal is obtained.

The higher layer unit 201 instructs the QoS control unit 2022 to cause the CCA level to be variable, using the acquired first indication information.

CCA Offset in FIG. 8 indicates an offset value of the CCA level in each AC of the STA 2. If a value of CCA Offset is assumed to be Co, a value of the CCA level of the STA 2 is assumed to be Cd, CCA level Ce used by STA 2 is calculated using Equation (2).

$$Ce = Cd + Co \qquad (2)$$

It is noted that CCA Offset is not limited to a value in FIG. 8, and may not be a value decided in advance. The AP 1 may cause CCA Offset to be changed for every STA 2, and may cause CCA Offset to be temporally changed.

For example, the AP 1 can decide CCA Offset in such a manner that a CCA level of the AC that has a high priority level is raised and a CCA level of the AC that has a low priority level is lowered. For example, CCA Offset is configured as described above, and thus it is possible that a great transmission opportunity is given the MAC frame of the AC that has a high priority. However, a method of deciding CCA Offset of the AP 1 according to the present embodiment is not limited to this. A method of deciding CCA Offset in such a manner that the CCA level of the AC that has a high priority level is lowered may be employed, and CCA Offset may be decided using other methods.

It is noted that the first CCA indication information may not be CCA Offset, and may be information associated with CCA Offset. Furthermore, instead of CCA Offset, the first CCA indication information may be information associated with a value for directly designating the CCA level used by the STA 2, and may be information associated with a method of calculating the CCA level used by the STA 2.

The QoS Capability in the broadcast signal is an information element for notifying the STA 2 of information associated with the acceptability and non-acceptability of the QoS.

The AP 1 according to the present embodiment may notify the STA 2 of the first CCA indication information using an information element other than the EDCA parameter that is an information element. Furthermore, a method of notifying the first CCA indication information is not limited to this, and the first CCS indication information may be included in the MAC header, a PLCP header, or the transmission data.

The wireless transmission unit 1033 performs processing that converts the transmission frame and the broadcast signal that are sent by the physical channel signal generation unit 1031 or the broadcast signal generation unit 1032, into the signal in the RF band. Processing performed by the wireless transmission unit 1033 includes the digital-to-analog conversion, the filtering, the frequency conversion from the baseband to the RF band, and the like.

The reception unit 104 has a wireless reception unit 1041 and a physical channel signal demodulation unit 1042. The wireless reception unit 1041 converts the signal in the RF band received by the antenna unit 105, into the physical channel signal. Processing performed by the wireless reception unit 1041 includes processing (processing for conversion to the physical channel signal) for frequency conversion from the RF band to the baseband, the filtering, and the analog-to-digital conversion. Furthermore, the wireless reception unit 1041 obtains information associated with the received power of the signal in the RF band, which is received by the antenna unit 105. Information associated with the received power is sent to the control unit 102, the comparison with the CCA level is made in the QoS control unit 1022, and thus the determination of whether the radio resource is busy or idle is made.

The physical channel signal demodulation unit 1042 performs the channel equalization, the demapping, the error correction decoding processing, and the like on the physical channel signal generated by the wireless reception unit 1041, and generates the demodulation data. The demodulation data is sent to the control unit 102, and then is sent to the higher layer unit 101.

The antenna unit 105 transmits the signal in the RF band, which is sent from the wireless transmission unit 1033, to the wireless space, in state of being destined for the STA 2. Furthermore, the signal in the RF band, which is transmitted from the STA 2, is received by the wireless space.

Figure 9:
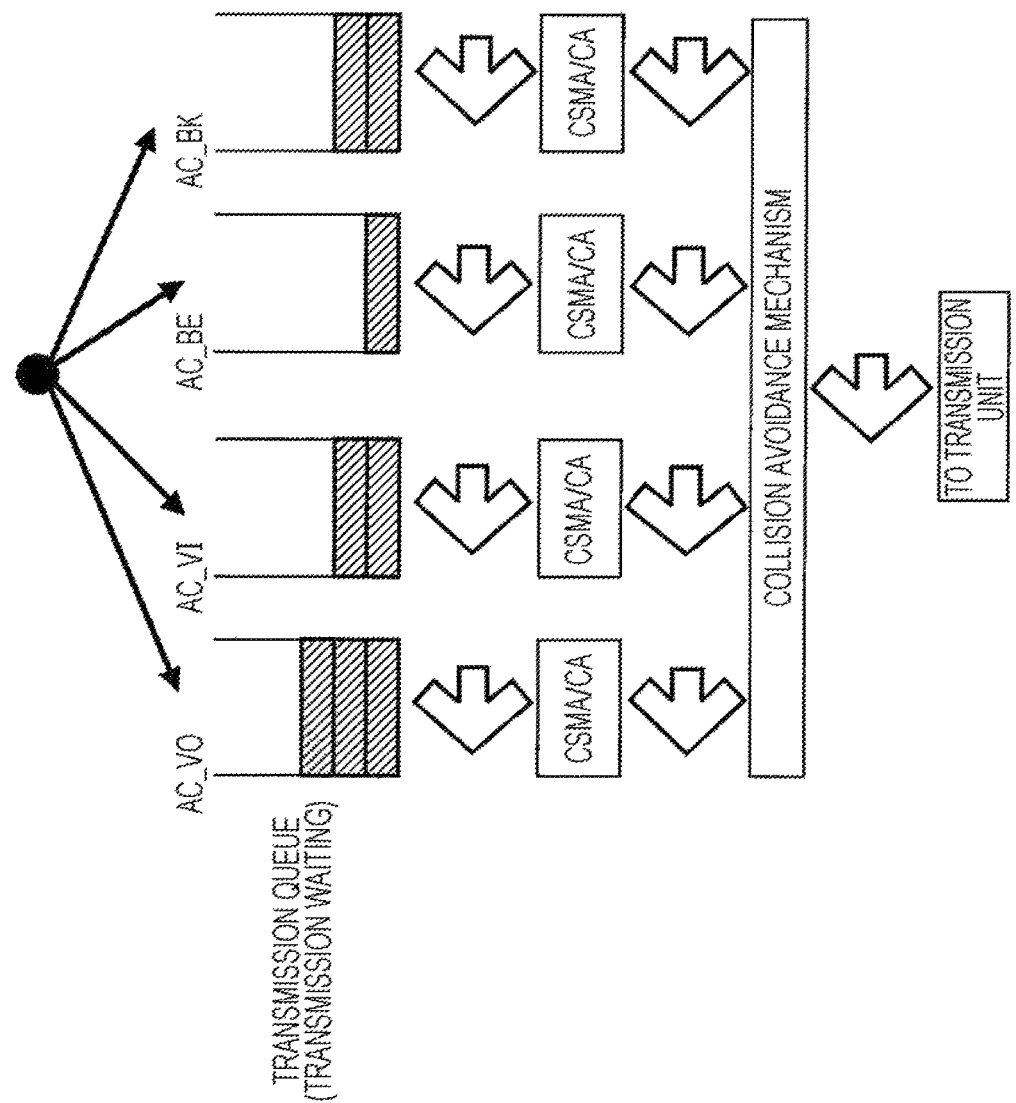
FIG. 9 is a schematic diagram of an example of operation of a QoS control unit 2022 in the STA 2.

FIG. 9 is a schematic diagram of an example of the QoS control unit 2022 in the STA 2. A transmission queue that corresponds to each of the AC's retains the MAC frame categorized by the MAC frame categorization unit 2021. The autonomous distribution control that is based on the CSMA/CA for every AC, a correspondence to which is established is performed on the retained MAC frame. The autonomous distribution control that is based on the CSMA/CA includes a transmission waiting operation and a backoff operation, in which the STA 2 waits only the AIFS or an IFS other than the AIFS for the transmission of the MAC frame. Based on the CCA indication information notified by the AP 1, the STA 2 generates the CW relating to the backoff for the MAC frame that corresponds to each of the AC's. The STA 2 sends one MAC frame selected by a collision avoidance mechanism, to the transmission unit.

It is noted that the STA 2 may configure the CCA level that corresponds to each of the AC's, based on second CCA indication information retained, by the STA 2, within the STA itself (in a memory, storage, a database, or the like), without depending on the first CCA indication information that is broadcast from the AP 1. Furthermore, the STA 2 may create third CCA indication information from information other than the EDCA parameter from the AP 1. For the creation of the third CCA indication information, the STA 2 may perform the categorization of the transmission frames by a type of transmission frame, and may change the CCA level for every transmission frame group that results from the categorization. Furthermore, because the present embodiment is also applicable to downlink transmission, it is possible that like the STA 2, the AP 1 also changes the CCA level according to each of the AC's or a category other than the AC, based on the first CCA indication information, the second CCA indication information, and the third CCA indication information.

With the AP 1 and the STA 2, which are described above, the CCA level is made to be variable based on the first CCA indication information, the second CCA indication information, or the third CCA indication information, which is retained by the STA 2, and thus a mechanism in which the CCA level is made to be effectively variable can be introduced and the radio resource can be efficiently used while maintaining the fairness relating to the acquisition of the transmission opportunities by the wireless terminal apparatuses. Because of this, it is possible that user throughput is greatly improved.

Second Embodiment

Figure 10:
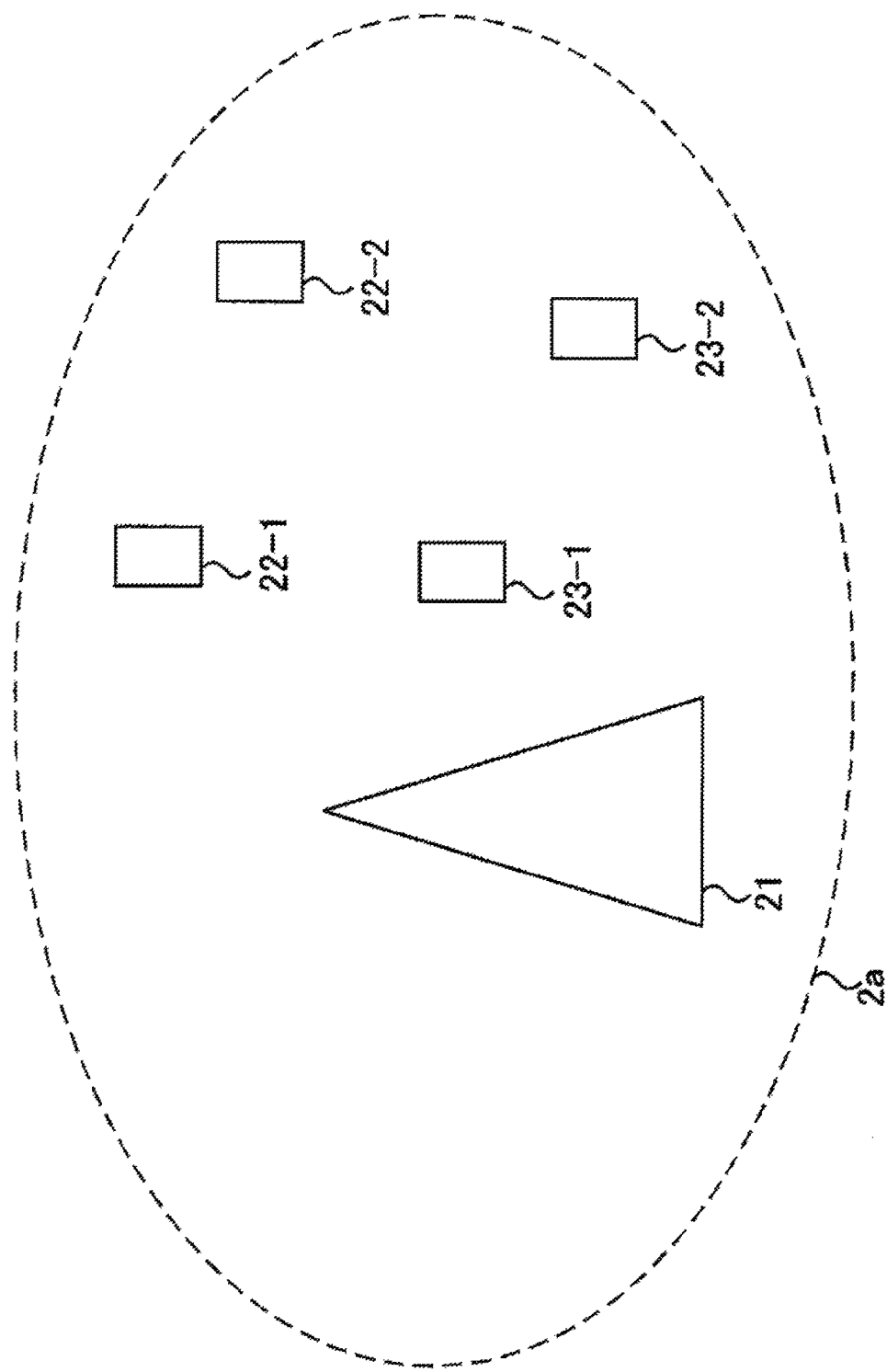
FIG. 10 is a diagram that schematically illustrates a communication system according to a second embodiment.

FIG. 10 is a diagram that schematically illustrates a communication system according to a second embodiment. The communication system illustrated in FIG. 10 includes an AP 21, STAs 22-1, 22-2, and STAs 23-1 and 23-2, and a BSS 2*a*. The BSS 2*a* includes the AP 21, the STAs 22-1 and 22-2, and the STAs 23-1 and 23-2. The STAs 22-1 and 22-2 are STAs that can make the CCA level variable, and the STAs 23-1 and 23-2 are terminals that have difficulty in making the CCA level variable. The STAs 22-1 and 22-2 and the STAs 23-1 and 23-2 will be described below as corresponding to the QoS, but the STAs 23-1 and 23-2 may not ensure the QoS. The STAs 22-1 and 22-2 and the STAs 23-1 and 23-2 are hereinafter also referred to as a STA 22 and a STA 23, respectively.

The AP 21, the STA 22, and the STA 23 each are assumed to perform communication based on the CSMA/CA. In the present embodiment, an infrastructure mode in which the STA 22, the STA 23, and the AP 21 perform the communication is intended, but a method according to the present embodiment is capable of being implemented also in the ad hoc mode in which the STAs directly perform the communication. It is noted that operation of the CSMA/CA is the same as in the first embodiment unless specified otherwise.

Figure 11:
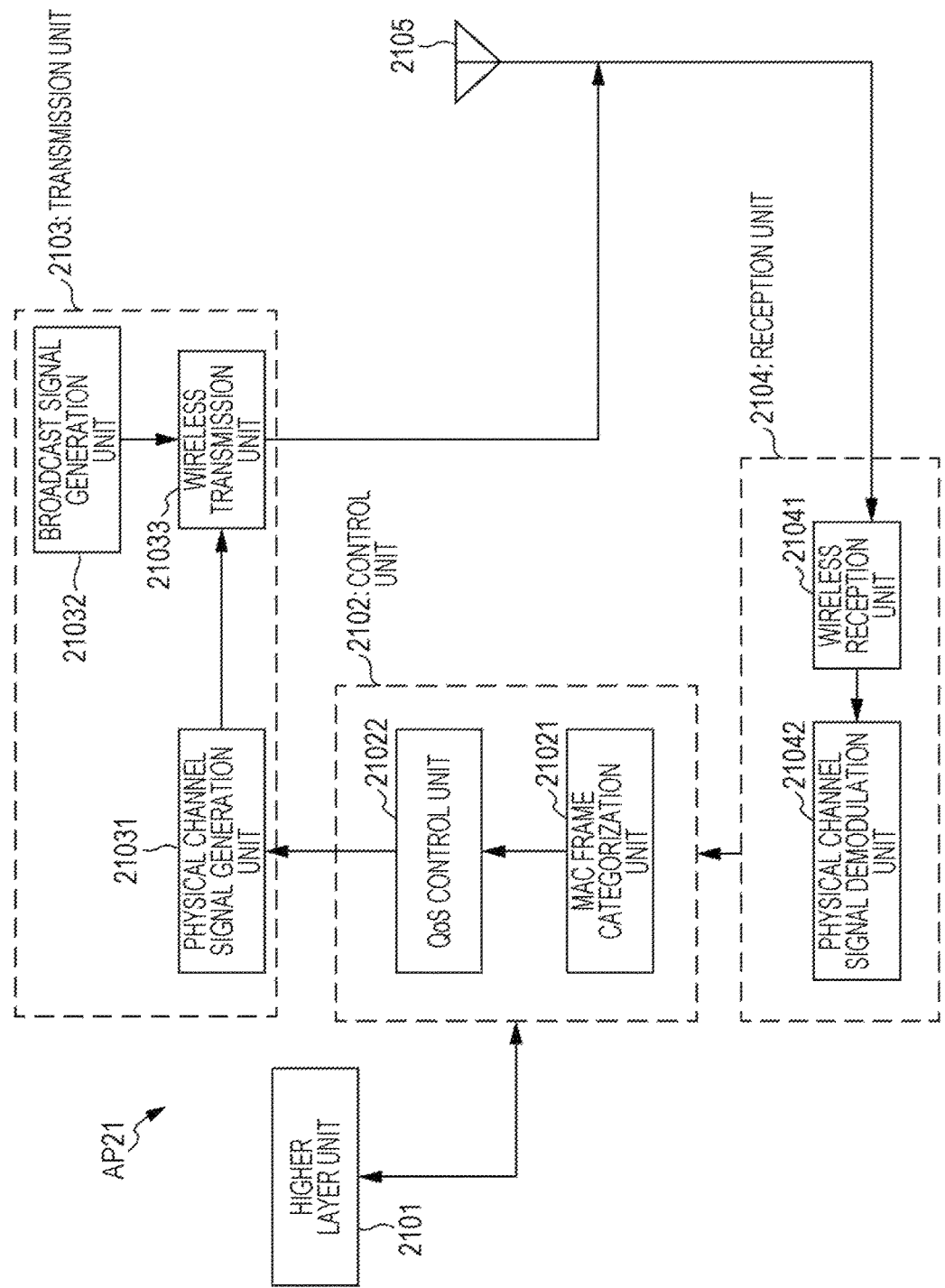
FIG. 11 is a block diagram illustrating an example of a constitution of an AP 21 according to the present embodiment.

FIG. 11 is a block diagram illustrating an example of a constitution of the AP 21 according to the present embodiment. As illustrated in FIG. 11, a higher layer unit 2101, a control unit 2102, a transmission unit 2103, a reception unit 2104, and an antenna unit 2105 are included. The control unit 2102 includes a MAC frame categorization unit 21021 and a QoS control unit 21022. The transmission unit 2103 includes a physical channel signal generation unit 21031 and a wireless transmission unit 21032. The reception unit 2104 includes a wireless reception unit 21041 and a physical channel signal demodulation unit 21042.

A comparison between the AP 21 and the AP 1 according to the first embodiment shows that the AP 21 has the broadcast signal generation unit 21032 different from the broadcast signal generation unit 21032 of the AP 1. However, in terms of the other constitutions, because functions that are the same as those according to the first embodiment are retained, descriptions thereof are omitted.

A broadcast signal generation unit 21032 generates the broadcast signal. The generated broadcast signal is converted into the physical channel signal, and is sent to a wireless transmission unit 21033. The broadcast signal can include information elements, such as the Beacon Inteval, the Supported Rates, the Power Constraint, the TPC Report, the EDCA parameter, and the QoS Capability information element.

The AP 21 according to the present embodiment has the feature of notifying information relating to a plurality of EDCA parameters through the broadcast signal generated by the broadcast signal generation unit. For example, the AP 21 can notify the STA 22 and the STA 23 of an EDCA parameter (axEDCA) for the STA 22 and an EDCA parameter (legacy EDCA) for the STA 23, respectively. For example, the AP 21 can add the first CCA indication information or the third CCA indication information to the axEDCA.

For example, the AP 21 can make a value of the AIFSN in the axEDCA greater than a value of the AIFSN in the legacy EDCA. Therefore, a transmission waiting time AIFS for the STA 23 is shorter than the AIFS for the STA 22. With the operation described above, the STA 22 makes the CCA variable and thus it is possible that the STA 23 is protected from the unfairness of a transmission opportunity acquisition rate to the STA 22 and the STA 23. It is noted that the AP 21 may change an EDCA parameter other than the AIFSN for the protection of the STA 23. Furthermore, the AP 21 may notify the STA 22 and the STA 23 of the axEDCA and the legacy EDCA for a purpose other than the protection of the STA 23.

Figure 12:
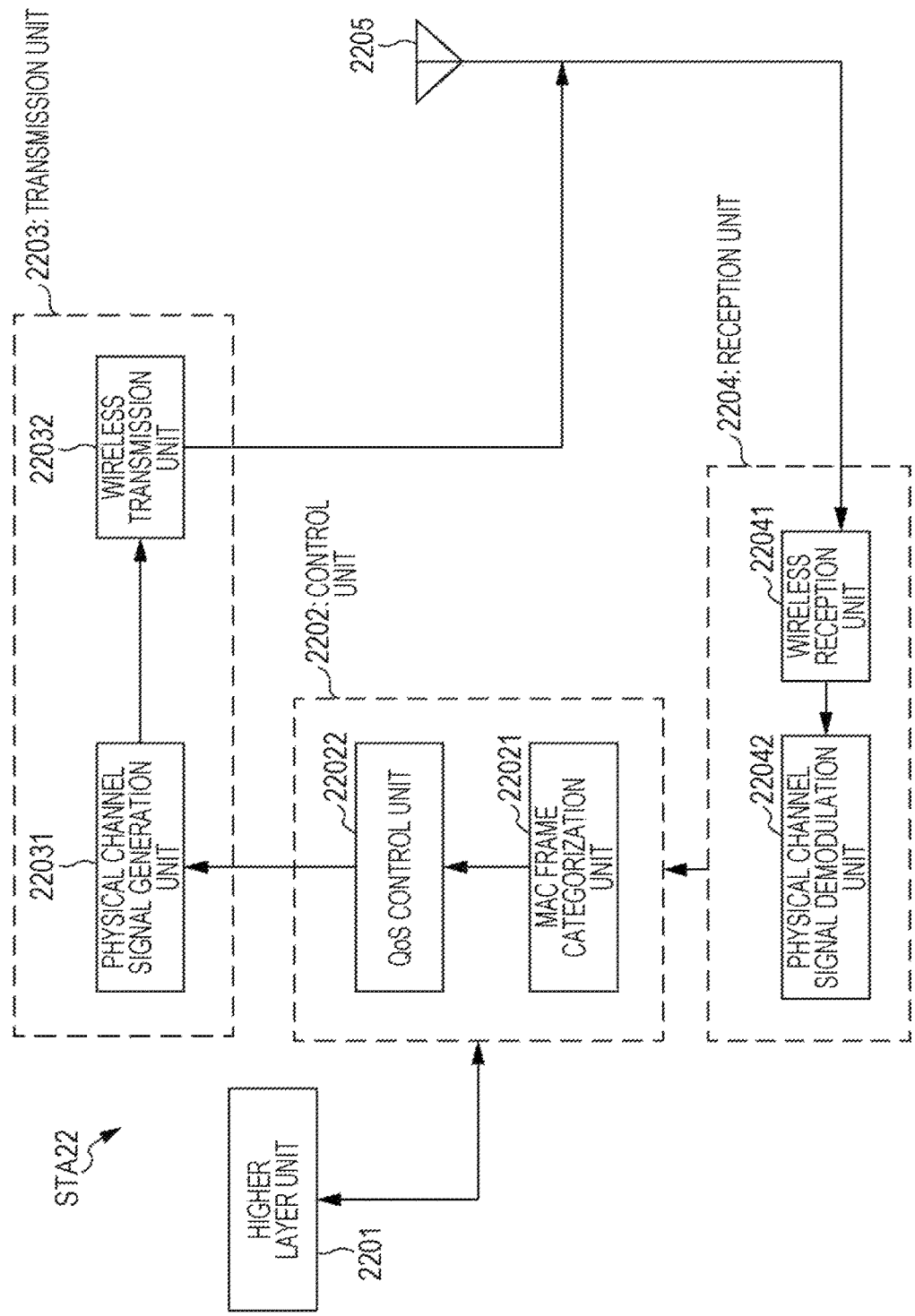
FIG. 12 is a block diagram illustrating an example of a constitution of a STA 22 according to the present embodiment.

FIG. 12 is a block diagram illustrating an example of a constitution of the STA 22 according to the present embodiment. As illustrated in FIG. 12, the STA 22 includes a higher layer unit 2201, a control unit 2202, a transmission unit 2203, a reception unit 2204, and an antenna unit 2205. The control unit 2202 includes a MAC frame categorization unit 22021 and a QoS control unit 22022. The transmission unit 22031 includes a physical channel signal generation unit 2203 and a wireless transmission unit 22032. The reception unit 2204 includes a wireless reception unit 22041 and a physical channel signal demodulation unit 22042.

A comparison between the STA 22 and the STA 2 according to the first embodiment shows that the STA 22 has the QoS control unit 22022 different from the QoS control unit 22022 of the STA 2. However, in terms of the other constitutions, because functions that are the same as those according to the first embodiment are retained, descriptions thereof are omitted.

The QoS control unit 22022 retains the post-categorization MAC frame, which is sent from the MAC frame categorization unit 22021, performs the autonomous distribution control that is based on the CSMA/CA, on every AC or on every category that results from performance by the MAC frame categorization unit 22021, and sends the MAC frame that gains a transmission opportunity, to the physical channel signal generation unit 22031. The QoS control unit 22022 obtains axEDCA information in a broadcast signal of the AP 21, and can make the CCA level variable based on the first CCA indication information or the third CCA indication information. In a case where the first CCA indication information from the axEDCA information, or the third CCA indication information is difficult to obtain, the QoS control unit 22022 can make the CCA level variable based on the second CCA indication information within the STA 22.

The STA 22 according to the present embodiment can obtain the axEDCA that is broadcast by the AP 21, and information relating to two types of EDCA parameters of the legacy EDCA, and can calculate CCA Offset from the axEDCA and the legacy EDCA.

The STA 22 will be described below as calculating CCA Offset from the axEDCA, and from information relating to the AIFSN of the legacy EDCA, but CCA Offset may be calculated using a parameter other than the AIFSN in the EDCA parameter.

A value of the AIFSN written to the axEDCA is assumed to be Nax, and a value of the AIFSN written to the legacy EDCA is assumed to be N1. Because the value of the AIFSN is configured for every AC, for example, configurations are assumed to be provided such as Nax=[7, 3, 2, 2] and N1=[4, 2, 1, 1], and AIFSN's of AC_BK, AC_BE, AC_VO, and AC_VI are assumed to be expressed starting from the first term. A Value Cal of CCA Offset is calculated using Equation (3).

$$Cal = \alpha * (Nax - N1) \qquad (3).$$

In Equation (3), α is a coefficient for calculating CCA Offset, and is a value retained in information notified by the AP 21 or in a database within the STA 22. Furthermore, a method of calculating CCA Offset is also a value retained in the information notified by the AP 21 and in the database within the STA 22. Information relating to the method of calculating the CCA is hereinafter also referred to as fourth CCA indication information. It is noted that the fourth CCA indication information is not limited to Equation (3), and other equations for calculation can be used.

The STA 23 is different from the STA 22 in that it is difficult to make the CCA variable. However, in terms of the other constitutions, because functions that are the same as those of the STA 22 are retained, descriptions thereof are omitted.

The STA 22 performs a QoS operation using the legacy EDCA that is broadcast by the AP 21. Because the legacy EDCA has a value different from the axEDCA, it is possible that the STA 23 and the STA 22 realize different QoS operations.

(1) A terminal apparatus according to the present embodiment is also capable of having the following aspects. That is, according to the present embodiment, there is provided a terminal apparatus that finds application in a communication system which controls a transmission opportunity using a carrier sense, and that performs wireless communication with a base station apparatus, the terminal apparatus including; a MAC frame categorization unit that categorizes MAC frames using a MAC frame categorization information for categorizing the MAC frames, and a QoS control unit that performs a carrier sense, for every category, on the MAC frame that results from the categorization, in which the QoS control unit changes a CCA level of the carrier sense performed for every category, based on first clear channel assessment (CCA) indication information obtained from the base station apparatus.

(2) Furthermore, in the terminal apparatus according to the present embodiment, the QoS control unit changes the CCA level of the carrier sense performed for every category, based on second CCA indication information retained by the terminal apparatus itself, instead of on the first CCA indication information.

(3) Furthermore, in the terminal apparatus according to the present embodiment, the first CCA indication information is included in an Enhanced Distributed Channel Access (EDCA) parameter.

(4) Furthermore, the terminal apparatus according to the present embodiment obtains third CCA indication information included in broadcast information other than the EDCA parameter, from the base station apparatus, and changes the CCA level of the carrier sense performed for every category, based on the third CCA indication information, instead of on the first CCA indication information.

(5) Furthermore, the terminal apparatus according to the present embodiment calculates fourth CCA indication information from information relating to a plurality of EDCA parameters that are broadcast by the base station apparatus, and makes CCA variable using the fourth CCA indication information.

(6) Furthermore, according to the present embodiment, there is proved a base station apparatus that finds application in a communication system which controls a transmission opportunity using a carrier sense, and performs wireless communication with at least one terminal apparatus, the base station apparatus including a control unit that generates first CCA indication information that indicates a Clear Channel Assessment Level (CCA) Level of the carrier sense performed, for every category, on the MAC frame that results from the categorization, in the terminal apparatus, and a wireless transmission unit that notifies the terminal apparatus of the first CCA information.

(7) Furthermore, in the base station apparatus according to the present embodiment, the first CCA indication information is information relating to a CCA level with which the terminal apparatus complies, or a method of calculating the information relating to the CCA level with which the terminal apparatus complies.

(8) Furthermore, in the base station apparatus according to the present embodiment, the first CCA indication information is included in a broadcast signal that is broadcast by the base station apparatus, a MAC header attached by a higher layer to transmission data, a PHY header attached by a physical channel signal generation unit to the MAC frame, or in a data frame.

(9) Furthermore, according to the present embodiment, there is provided a base station apparatus including a MAC frame categorization unit that categorizes MAC frames based on MAC frame information, and a QoS control unit that performs the carrier sense performed, for every category, on the MAC frame, using the MAC frame categorization information, in which the CCA level is calculated based on the second CCA indication information, a CCA level is changed when performing the carrier sense, for every category, on the MAC frame using the MAC frame categorization information.

(10) Furthermore, in the base station apparatus according to the present embodiment notifies the terminal apparatus of information relating to the plurality of EDCA parameters.

As described above, with the AP 21, the STA 22, and the STA 23 according to the present embodiment, each of a terminal in compliance with 802.11ax and a legacy terminal can be caused to perform different QoS operations using information relating to two types of EDCA parameters, the axEDCA and the legacy EDCA, and while the terminal in compliance with 802.11ax greatly improves throughput with the variability of the CCA level, it is also possible that the legacy terminal is protected from a decrease in throughput.

Moreover, the present international application claims the benefits of Japanese Patent Application No. 2015-001187 filed on Jan. 6, 2015, and the entire contents of Japanese Patent Application No. 2015-001187 are incorporated herein by reference.

REFERENCE SIGNS LIST

1 AP
2-1 to 2-3 STA
101 HIGHER LAYER UNIT
102 CONTROL UNIT
103 TRANSMISSION UNIT
104 RECEPTION UNIT
105 ANTENNA UNIT
201 HIGHER LAYER UNIT
202 CONTROL UNIT
203 TRANSMISSION UNIT
204 RECEPTION UNIT
205 ANTENNA UNIT
1021 MAC FRAME CATEGORIZATION UNIT
1022 QoS CONTROL UNIT
1031 PHYSICAL CHANNEL SIGNAL GENERATION UNIT
1032 BROADCAST SIGNAL GENERATION UNIT
1033 WIRELESS TRANSMISSION UNIT
1041 WIRELESS RECEPTION UNIT
1042 PHYSICAL CHANNEL SIGNAL DEMODULATION UNIT
2021 MAC FRAME CATEGORIZATION UNIT
2022 QoS CONTROL UNIT
2031 PHYSICAL CHANNEL SIGNAL GENERATION UNIT
2032 WIRELESS TRANSMISSION UNIT

2041 WIRELESS RECEPTION UNIT
2042 PHYSICAL CHANNEL SIGNAL DEMODULATION UNIT
2101 HIGHER LAYER UNIT
2102 CONTROL UNIT
2103 TRANSMISSION UNIT
2104 RECEPTION UNIT
2105 ANTENNA UNIT
2201 HIGHER LAYER UNIT
2202 CONTROL UNIT
2203 TRANSMISSION UNIT
2204 RECEPTION UNIT
2205 ANTENNA UNIT
21021 MAC FRAME CATEGORIZATION UNIT
21022 QoS CONTROL UNIT
21031 PHYSICAL CHANNEL SIGNAL GENERATION UNIT
21032 BROADCAST SIGNAL GENERATION UNIT
21033 WIRELESS TRANSMISSION UNIT
21041 WIRELESS RECEPTION UNIT
21042 PHYSICAL CHANNEL SIGNAL DEMODULATION UNIT
22021 MAC FRAME CATEGORIZATION UNIT
22022 QoS CONTROL UNIT
22031 PHYSICAL CHANNEL SIGNAL GENERATION UNIT
22032 WIRELESS TRANSMISSION UNIT
22041 WIRELESS RECEPTION UNIT
22042 PHYSICAL CHANNEL SIGNAL DEMODULATION UNIT

The invention claimed is:

1. A first terminal apparatus that communicates with a second terminal apparatus, the first terminal apparatus comprising:
a processor configured to assess whether a radio resource is idle or busy, using a carrier sense based on a first threshold value and a second threshold value; and
a transmission unit configured to transmit a frame,
wherein the transmission unit transmits the frame which includes MAC (Media Access Control) data including information associated with QoS (Quality of Service) and a PHY (Physical) header including first information associated with the carrier sense,
the first information associated with the carrier sense allows the second terminal apparatus to use the second threshold value, and
the PHY header includes second information indicating difference between the first threshold value and the second threshold value.

2. The first terminal apparatus according to claim 1, wherein the information associated with QoS is information indicating an access category.

3. The first terminal apparatus according to claim 2, wherein the first information associated with the carrier sense is threshold information of the carrier sense.

4. The first terminal apparatus according to claim 3, wherein the threshold information of the carrier sense is configured when the frame that configures the access category indicated by information for configuring the access category is transmitted.

5. A communication method used for a first terminal apparatus that communicates with a second terminal apparatus, the communication method comprising the steps of:
determining whether a radio resource is idle or busy, using a carrier sense based on a first threshold value and a second threshold value; and
transmitting a frame,
wherein the frame includes MAC data including information associated with QoS and a PHY (Physical) header including first information associated with the carrier sense,
the first information associated with the carrier sense allows the second terminal apparatus to use the second threshold value, and
the PHY header includes second information indicating difference between the first threshold value and the second threshold value.

* * * * *